Dec. 13, 1955  F. G. VON HOORN  2,727,109
TIME LAG FUSE LINK
Filed Jan. 19, 1953
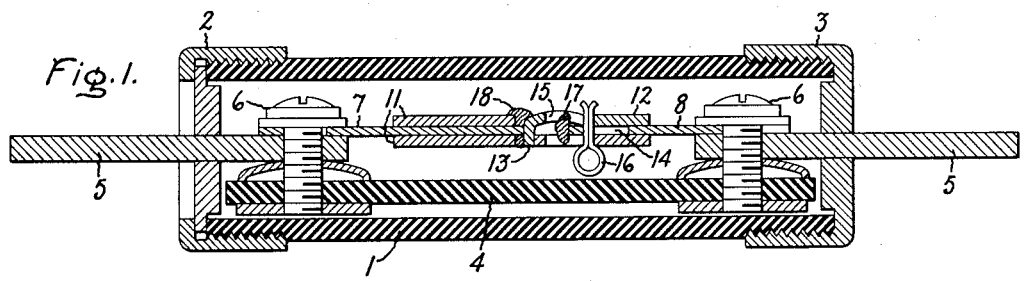
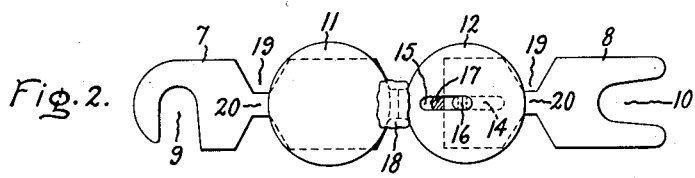
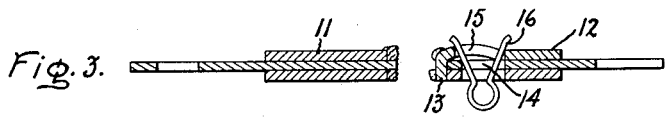
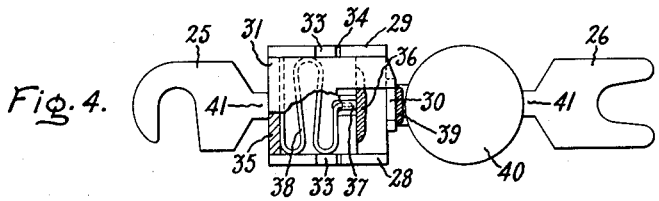
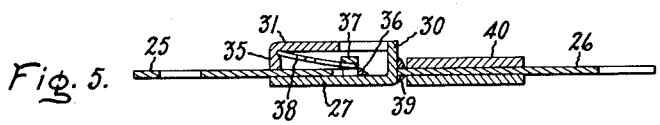
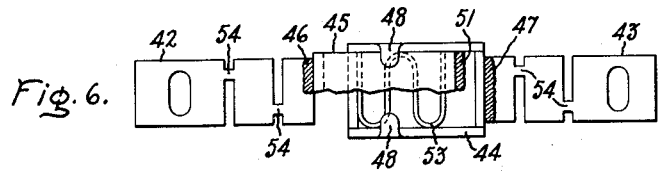
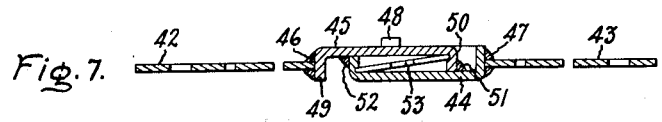
Inventor:
Fred G. von Hoorn,
by
His Attorney.

United States Patent Office 2,727,109
Patented Dec. 13, 1955

2,727,109

TIME LAG FUSE LINK

Fred G. von Hoorn, Bridgeport, Conn., assignor to General Electric Company, a corporation of New York Application January 19, 1953, Serial No. 331,812

1 Claim. (Cl. 200—117)

This application is a continuation-in-part of my application Serial No. 203,706, filed December 30, 1950, now abandoned.

The invention relates to time lag fuse links such as are used in fuses of the cartridge type and has for its object to provide an improved time lag fuse link which is simple in structure, reliable in operation, has good operating characteristics, and is capable of being manufactured at low cost. The invention is adapted for use in cartridge fuses of either the knife-blade type or the ferrule type.

In a motor circuit, it is necessary to compensate for two possible electrical conditions. The first is a sustained overload current such as would pass through a stalled rotor; while the second is a short circuit condition wherein high short circuit currents would exist.

In relation to the first of these conditions, it is well known that high current is required to start a motor from standstill. After the rotor is brought up to speed, however, a counterelectromotive force is set up which reduces the starting current. A fuse in a motor circuit, then, must permit the passage of high starting current for a reasonable time in order to get the motor up to speed. If this high starting current continues for an unreasonable time, however, then it is necessary to interrupt the circuit to prevent doing damage to the motor. It is obvious, therefore, that a fuse in a motor circuit to compensate for such a condition must primarily allow a high current to pass through the motor for a limited time and must interrupt the circuit only when this high current has passed through for longer than a predetermined time.

The second condition mentioned above is a short circuit. When short circuit conditions exist, an extremely high current may flow through the motor so that it is necessary to interrupt the circuit immediately in order to prevent damage to the motor or other parts of the circuit.

While combination overload and short circuit fuses have been known, there is still need in the art for an improved fuse of this type.

For a consideration of what I believe to be novel and my invention, attention is directed to the following specification and to the claim appended thereto.

According to my invention, the improved fuse link comprises two axially aligned fuse link members spaced apart at their inner ends and having connected to such spaced-apart ends by fusible solder heat storage mass means which bridges the gap between such inner ends, a stressed spring means being provided which engages the heat storage mass means and which, when the solder melts, effects movement of the heat storage mass means to disrupt the circuit through the fuse link.

In the drawing,

Fig. 1 is a sectional view of a cartridge type fuse in which is a fuse link embodying the invention;

Fig. 2 is a top plan view of the fuse link;

Fig. 3 is a longitudinal sectional view of the fuse link after the fuse has been disrupted by flow of current through it;

Fig. 4 is a top plan view partly broken away of a modified form of fuse link embodying the invention;

Fig. 5 is a longitudinal sectional view of the structure shown in Fig. 4;

Fig. 6 is a top plan view partly broken away of another construction embodying the invention; and Fig. 7 is a sectional view of the modification shown in Fig. 6.

In Fig. 1 the casing 1 of a cartridge type fuse formed from a suitable fiber insulating material is provided with metal end caps 2 and 3. In the casing is a fuse link carrier comprising a strip 4 of insulating material which forms a spacer bar, and to the ends of which are attached the terminal blades 5 by screws 6. The fuse link is attached to the carrier by the screws 6 as shown in Fig. 1. The structure so far described is a known one and is to be taken as typical of any suitable cartridge type fuse. My invention has to do with the structure of the fuse link.

Referring to Figs. 1 to 3 inclusive, the fuse link comprises two end fuse link members 7 and 8 each of which at its outer end is provided with suitable means for attaching it to a fuse link carrier. In the present instance, link member 7 is provided with a hooked end 9 and link member 8 is provided with a furcate end 10 for attaching the link under the head of screws 6, this being a known fuse link attaching means. The fuse links themselves are suitably made of copper or zinc as is well known in the art.

Attached to the adjacent spaced-apart ends of fuse link members 7 and 8 is an electrically conductive heat storage mass means comprising two parts 11 and 12 suitably made of copper or other material having a conveniently high specific heat. The part 11 suitably takes the form of two disks or blocks fixed to opposite sides of link member 7. The part 12 is in the form of two disks or blocks attached to each other at their inner ends, that is, at the portions nearest the center of the fuse link. This is suitably facilitated by providing a tab on the upper disk which is bent down to fit a notch in the lower disk as indicated at 13, the assembly being telescopically mounted on link member 8 so as to be movable axially thereon. Link member 8 and part 12 are respectively provided with axially aligned extending slots 14 and 15 in which is positioned a hairpin type spring 16. As shown in Figs. 1 and 2, part 12 is positioned with respect to link member 8 so the legs of the hairpin type spring 16 are squeezed together between the inner end of slot 14 and the outer end of slot 15 so that the spring is held under compression and acts in a direction, as viewed in Figs. 1 and 2, to move mass part 12 to the right away from mass part 11, mass part 12 sliding on the inner end of fuse link member 8.

The mass part 12 is held in place prior to the blowing of the fuse by a low melting point solder. Any of various well-known metals or alloys developed for this purpose may be employed, the solder suitably having a melting point in the 200° to 300° Fahrenheit range. Mass part 12 is accordingly connected to the link member 8 by a body of such solder in the slots 14 and 15 as is indicated at 17. It is also connected under tension to the facing end of the mass part 11 by another body of solder as is indicated at 18. Thus, there is formed a rigid fuse link wherein spring 16 is held under compression and wherein the fuse link members and the mass parts are united by solder to provide good electrical connections for flow of current through the fuse link.

As may be seen in Fig. 2, link members 7 and 8 are provided with notches 19 which serve to define regions 20 of relatively small or limited cross-sectional area, the function of which is to provide heat generating sections upon the passage of the current therethrough.

In operation, the heat storage mass comprising mass parts 11 and 12 absorbs heat caused by flow of current through heat generating regions 20 but with normal current or with flow above normal for a short period of time, the heat is dissipated rapidly enough so that the mass parts do not reach a temperature high enough to effect the melting of the fusible solder. However, with sustained flow above normal rated flow, the mass parts will reach a temperature high enough to effect the melting of the solder whereupon spring 16 will expand, moving mass part 12 to the right on the inner end of link member 8 (as shown in Fig. 3) to disrupt the circuit through the fuse link.

In case of a short circuit, the fuse members 7 and 8 themselves blow at the heat generating regions 20 as is well understood in connection with the operation of fuse links of the dual short circuit and time lag type.

In Figs. 4 and 5 is shown a modification of the invention wherein one of the two mass parts of the heat storage mass means forms a housing for the actuating spring which moves the two mass parts relatively to each other to disrupt the circuit through the fuse link. In these figures, 25 and 26 indicate the two fuse link members corresponding to fuse link members 7 and 8 of Figs. 1 to 3. Their adjacent inner ends are spaced apart and connected to such ends is the heat storage mass means. The heat storage mass part which houses the spring comprises a lower mass section having a bottom wall 27, opposed side walls 28 and 29 and a tongue 30 integral with the right hand end of bottom wall 27 and positioned centrally of such ends. Attached to the lower mass section is a cover wall 31 which fits between side walls 28 and 29 and is attached thereto by outwardly projecting tongues 33 locked in notches 34 in the top edges of the side walls. Wall 31 has a flange 35 at its one end which is positioned between side walls 28 and 29. The inner end of fuse link member 25 projects loosely into the housing along the top surface of bottom wall 27 and beneath flange 35 and is attached to the bottom wall by fusible solder as is indicated at 36. At the inner end of link member 25 is a struck up lug 37. Between the lug and flange 35 is positioned a relatively flat multiple S-shaped spring 38 which is under compression so that it tends to telescope the housing toward the left on the inner end of link member 25. Tongue 30 is connected to the inner end of fuse link member 26 by fusible solder as is indicated at 39.

Fastened on link member 26 at its inner end is a heat storage mass part comprising disk 40. The several parts of the fuse link structure when soldered together by low melting point solder as shown form a rigid fuse link member wherein the parts are well connected electrically for flow of current through them.

Both link members 25 and 26 are provided at their side edges with notches which define regions 41 of limited cross-sectional area to provide the heat generating sections of fuse link.

The operation of the modification of Figs. 4 and 5 is similar to that of Figs. 1 to 3. As is apparent from the explanation given in connection therewith, the spring 38, when the solder 36 and 39 melts, effects movement of the heat storage mass part comprising the housing toward the left to disrupt the flow of current through the fuse link. In case of short circuit currents the fuse links themselves blow at the restricted portions 41.

In the modification shown in Figs. 1 to 3 and Figs. 4 and 5 there has been shown in each instance a heat storage mass means comprising two mass parts, one of which is fixed on one of the fuse link members and the other of which is movable on the other of the fuse link members. I may, in some instances, omit the fixed heat storage mass part, using only the movable heat storage mass part, this being a satisfactory arrangement where the movable heat storage mass part by itself has sufficient heat storage capacity to effect the desired fuse link operation and give the fuse link the desired operating characteristics.

In Figs. 6 and 7 is illustrated another modification of the invention, it being shown as being embodied in a fuse link for use in a fuse link holder of the ferrule type. In this modification the two fuse link members 42 and 43 are connected together at their inner ends by heat storage mass means comprising two parts 44 and 45, the upper part 45 being of down-turned channel shape and connected to link member 42 by fusible solder as is indicated at 46 and the lower part 44 being connected to link member 43 by fusible solder as is indicated at 47. Part 44 has bottom, side and end walls as clearly shown in the drawing to form an open top housing and part 45 is in the form of a cover plate which fits between the side walls of part 44, being held by turned-in ears 48, and has flanges 49 and 50 at its ends. Flange 49 is connected to link member 42 by the solder 46, and flange 50 is connected to the bottom wall of part 44 by fusible solder as is indicated at 51. Also, the left hand end wall of part 44 is connected to part 45 by fusible solder as is indicated at 52. The several solder bonds serve to give rigid link structure and form good electrical connections for flow of current through the fuse link.

Mass parts 44 and 45 interfit loosely before soldering so they may slide readily relatively to each other upon melting of the solder. Positioned in the housing formed by the mass parts and biased against the opposed walls thereof is a relatively flat compression spring 53 which is held under compression and acts in a direction to move mass parts 44 and 45 toward each other and away from the adjacent ends of link members 42 and 43.

Link members 42 and 43 are provided in their side edges with notches which define regions 54 of limited cross-sectional area to provide the heat generating sections of the fuse links.

The operation of this modification is similar to that of the other two, the solder at the several points when melting due to flow of current permitting the spring to force mass parts 44 and 45 together to disrupt the circuit through the fuse link. Again for short circuit currents the fuse links blow at the restricted portions 54.

The modification of Figs. 6 and 7 also has an advantageous feature in that when the fuse link operates on overload, the heat storage mass means as a whole drops away from between the ends of link members 42 and 43 to effect a wide breach in the fuse link.

While the present invention has been described by reference to particular embodiments thereof, it will be understood that numerous modifications may be made by those skilled in the art without actually departing from the invention. I, therefore, aim in the appended claim to cover all such equivalent variations as come within the true spirit and scope of the foregoing disclosure.

What I claim as new and desire to secure by Letters Patent of the United States is:

A fuse link comprising two fuse link members arranged in axial alignment with their inner ends spaced apart and their outer ends spaced for connection with contact members of a cartridge fuse holder, said link members being provided with regions of limited cross-sectional area to provide heat generating sections, a hollow two-piece heat storage mass which bridges the space between said inner ends and is connected to said inner ends by fusible solder, the lower member of said heat storage mass having a bottom wall and upturned side and end walls, the upper member of said heat storage mass comprising a down-turned channel-shaped member with its base portion resting on the top of one of the said end walls, and opposed ears formed as a part of the said side walls at the sides of said upper channel member to closely overlie said channel member, and a compression spring member bearing at one end against the inner end of the bottom member and at its other end against the inner end of the upper member so that when the members of the heat storage mass are soldered to the inner ends of the link members and to each other the said spring will be compressed, whereby when the fusible solder melts due to excessive current the spring will effect movement of said heat storage mass so that it drops out of contact with the said link members.

References Cited in the file of this patent

UNITED STATES PATENTS

| | | |
|---|---|---|
| 1,188,152 | Cole | June 20, 1916 |
| 2,159,423 | Bussmann | May 23, 1939 |
| 2,296,627 | Brown | Sept. 22, 1942 |
| 2,300,142 | Wood | Oct. 27, 1942 |
| 2,321,711 | Taylor | June 15, 1943 |
| 2,489,314 | Patton | Nov. 29, 1949 |
| 2,657,294 | Laing | Oct. 27, 1953 |
| 2,667,551 | Berthel | Jan. 26, 1954 |